(12) United States Patent
Wu

(10) Patent No.: US 6,836,469 B1
(45) Date of Patent: Dec. 28, 2004

(54) MEDIUM ACCESS CONTROL PROTOCOL FOR A MULTI-CHANNEL COMMUNICATION SYSTEM

(75) Inventor: Chiung-Shien Wu, Hsinchu (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 0 days.

(21) Appl. No.: 09/231,833

(22) Filed: Jan. 15, 1999

(51) Int. Cl.[7] .................................................. H04J 12/28
(52) U.S. Cl. ........................ 370/322; 370/230; 370/320
(58) Field of Search ................................. 370/230–238, 370/320, 322, 209, 280, 342, 445, 311, 349, 329, 335, 441, 347, 348, 443

(56) References Cited

U.S. PATENT DOCUMENTS

| | | | | |
|---|---|---|---|---|
| 4,773,066 A | * | 9/1988 | Kirkman ...................... | 370/445 |
| 4,841,527 A | | 6/1989 | Raychaudhuri et al. | |
| 5,394,391 A | | 2/1995 | Chen et al. | |
| 5,539,730 A | * | 7/1996 | Dent .......................... | 370/280 |
| 5,581,547 A | | 12/1996 | Umeda et al. | |
| 5,638,371 A | | 6/1997 | Raychaudhuri et al. | |
| 5,673,259 A | | 9/1997 | Quick, Jr. | |
| 5,748,104 A | | 5/1998 | Argyroudis et al. | |
| 5,822,359 A | * | 10/1998 | Bruckert et al. ............ | 370/209 |
| 5,940,379 A | * | 8/1999 | Startup et al. .............. | 370/320 |
| 5,991,308 A | * | 11/1999 | Fuhrmann et al. .......... | 370/342 |
| 6,088,337 A | * | 7/2000 | Eastmond et al. .......... | 370/280 |
| 6,160,801 A | * | 12/2000 | Uchida et al. .............. | 370/335 |
| 6,621,807 B1 | * | 9/2003 | Jung et al. .................. | 370/335 |

OTHER PUBLICATIONS

Telecommunications Industry Association, TIA/EIA/IS–95–A, May 1995, TIA.*
D. Raychaudhuri and N.D. Wilson, "ATM–Based Transport Architecture for Multiservices Wireless Personal Communication Networks," IEEE Journal on Selected Areas in Communications, vol. 12, No. 8, Oct. 1994, pp 1401–1414.
W. Yue, "The Effect of Capture on Performance of Multi-channel Slotted ALOHA Systems," IEEE Transactions on Communications, vol. 39, No. 6, Jun. 1991, pp. 818–822.
A Polydoros and J. Silvester, "Slotted Random Access Spread–Spectrum Networks: An Analytical Framework," IEEE Journal on Selected Areas in Communication, vol. SAC–5, No. 6, Jul. 1987, pp. 989–1002.

(List continued on next page.)

*Primary Examiner*—Wellington Chin
*Assistant Examiner*—William Schultz
(74) *Attorney, Agent, or Firm*—Stevens, Davis, Miller & Mosher,LLP

(57) ABSTRACT

A medium access control (MAC) protocol for controlling data communication in a multi-channel communication system (e.g., a wideband code division multiple access system). The protocol provides a procedure for transmitting, via a plurality of data links and control links, data packets between a first station (e.g., a base station) and one or more second stations (e.g., mobile stations). The protocol includes initial transmission of one or more data request packets each having a preamble code and a cyclic redundant code from the second stations to the first station, subsequent transmission of one or more channel assignment commands from the first station to one or more of the second stations based on the data request packets processed by the first station, and final transmission of one or more data packets from the one or more of the second stations to the first station based on the channel assignment commands. The data and request packets, which are respectively transmitted over a forward control link and a plurality of reverse control links, are respectively encoded by a predetermined number of scrambling codes.

8 Claims, 16 Drawing Sheets

OTHER PUBLICATIONS

D. Makrakis and K.M.S. Murthy, "Spread Slotted ALOHA Techniques for Mobile and Personal Satellite Communication Systems," IEEE Journal on Selected Areas in Communications, vol. 10, No. 6, Aug. 1992, pp. 985–1002.

K. Toshimitsu, T. Yamazato, M. Katayama, and A. Ogawa, "A Novel Spread Slotted ALOHA System with Channel Load Sensing Protocol," IEEE Journal on Selected Areas in Communications, vol. 12, No. 4, May 1994, pp. 665–672.

Z. Zhang and Y. Liu, "Comments on 'The Effect of Capture on Performance of Multichannel Slotted ALOHA system'", IEEE Transaction on Communications, vol. 41, No. 10, Oct. 1993, pp. 1433–1435.

Bertsekas, et al., "Data Networks," Second Edition, Prentice–Hall International Editions, 1992 pp. 271–293 and 304–305.

Andrew S. Tanenbaum, "Computer Networks," Third Edition, International Edition, 1996 pp. 246–261.

Liu, et al., "Performance Analysis of DS–CDMA with Slotted ALOHA Random Access for Packet PCNs," ACM/Baltzer Wireless Networks, vol. 1, No. 1, Feb. 1995, pp. 1–16.

ETSI SMG2, "Concept Group Alpha—Wideband Direct–Sequence CDMA (WCDMA) Evaluation Document (3.0) (Draft 1.0) Part 1: System Description Performance Evaluation," UMTS Terrestrial Radio Access (UTRA), draft document, Oct. 1997, pp. 1–53.

ETSI, "Radio Equipment and Systems (RES); High PErformance Radio Local Area Network (HIPERLAN) Type 1; Functional Specification", ETS 300 652, Oct. 1996, pp. 1–112.

G.A. Halls, "HIPERLAN: the high performance radio local area network standard", Electronic and Communication Engineering Journal, Dec. 1994, pp. 289–296.

I. Habbab, et al., "Protocls for Very High–speed Optical Fiber Local Area Networks Using a Passive Star Topology", IEEE Journal of Lightwave Technology, vol. 5, Issue 12, Dec. 1987, pp. 1782–1794.

TIA TR–45.5, "The CDMA2000 ITU–R–RTT Candidate Submission", Jun. 1998, pp. 1–309.

TS 101 350 V6. 0.1, (1998–08) "Digital cellular telecommunications system (Phase 2+); General Packet Radio Service (GPRS); Overall description of the GPRS radio interface; Stage 2", Aug. 1998, pp. 1–56.

ETSI TS 101 349 V6. 10.0 (2000–10), "Digital cellular telecommunications system (Phase 2+); General Packet Radio Service (GPRS); Mobile Station (MS)–Base Station System(BSS interface; Radio Link Control/Medium Access Control (RLC/MAC) protocol", Oct. 2000, pp. 1–221.

* cited by examiner

MEDIUM ACCESS CONTROL PROTOCOL FOR A MULTI-CHANNEL COMMUNICATION SYSTEM

BACKGROUND OF THE INVENTION

1. Field of the Invention

This invention generally relates to communication systems. More specifically, the present invention relates to a medium access control (MAC) protocol for use in a multi-channel communication system based on, for example, Code Division Multiple Access (CDMA), Wavelength Division Multiple Access (WDMA), Frequencies Division Multiple Access (FDMA) or other multiple-channel systems.

2. Description of Related Art

In a typical wireless communication system, messages are transmitted asynchronously via data packets between a base station (BS) and a plurality of mobile stations (MS). Each of the data packets includes an information portion containing a coded message and a header description portion containing codes indicating the terminals destined to receive the message. The wireless communication system may be a single-channel system, based on, for example, TDMA in which the data packets are transmitted serially and successively in the same channel in the time domain (i.e., they are transmitted in different time-slots in the same channel), or a multi-channel system, such as CDMA, FDMA, or WDMA, in which the data packets are transmitted either serially in the same channel or concurrently in different channels.

FIG. 1 illustrates a conventional single-channel wireless communication system. The system has an uplink channel 12 and a downlink channel 14 which carry data packets between mobile stations $16_1$–$16_3$ and base station 18.

FIG. 2 shows a conventional multi-channel wireless communication system 20 having a plurality of uplink channels $22_1$–$22_3$ and downlink channels $24_1$–$24_3$. Uplink channels $22_1$–$22_3$ are used to transmit data packets from mobile stations $26_1$–$26_3$ to a base station 28. Downlink channels $24_1$–$24_3$ transmit data packets form base station 28 to mobile stations $26_1$–$26_3$. The systems shown in FIGS. 1 and 2 are contentional systems in which the respective mobile stations share one or more common channels in a manner that can lead to conflicts.

The following references provide background information relating to wireless communication systems and are hereby incorporated by reference in their entireties:

(1) D. Bertsekas, and R. Gallager, "Data Networks", $2^{nd}$ edition, Prentice-Hall Inc.

(2) A. Tanenbaum, "Computer Networks", $3^{rd}$ edition, Prentice-Hall Inc., 1996;

(3) ETSI, "Radio Equipment and Systems (RES); High Performance Radio Local Area Network (HIPERLAN); Functional Specification," Version 1.1 25/01/1995;

(4) G. A. Halls, "HIPERLAN: The High Performance Radio Local Area Network Standard," Electronic and Communication Engineering Journal, pp. 289–296;

(5) Raychaudhuri, . . . et al., "Multiservices Medium Access Control Protocal for Wireless ATM System", U.S. Pat. No. 5,638,371, June 1997;

(6) D. Raychaudhuri, and N. D. Wilson, "ATM-Based Transport Architecture for Multiservices Wireless Personal Communication Networks," IEEE Journal on Selected Area in Communications, Vol. 12, No. 8, October 1994, pp. 1401–1414;

(7) W. Yue, "The Effect of Capture on Performance of Multichannel Slotted ALOHA Systems", IEEE Transactions on Communications, Vol. 39, No. 6, Jun. 1991, pp. 818–822;

(8) Z. Liu, and M. El Zarki, "Performance Analysis of DS-CDMA with Slotted ALOHA Random Access for Packet PCNs", ACM/Baltzer Wireless Networks, Vol. 1, No. 1, February 1995, pp. 1–16;

(9) Chen et al., "Method of Controlling the Operation of a Packet Switched CDMA Telecommunication Network", U.S. Pat. No. 5,394,391, February 1995;

(10) Umeda et al., "Random Access Communication Method by CDMA and Mobile Station Equipment Using the Same", U.S. Pat. No. 5,581,547, December 1996;

(11) Raychaudhuri et al., "Stabilization of Random Access Packet CDMA Networks", U.S. Pat. No. 4,841,527, June 1989;

(12) I. M. I. Habbab, M. Kavehrad, and C. W. Sundberg, Protocols for Very High-speed Optical Fiber Local Area Networks Using a Passive Star Topology", IEEE Journal of Lightwave Technology, Vol. LT-5, No. 12, December 1987, pp. 1782–1793;

(13) ETSI SMG2, "Concept group Alpha-Wideband Direct-Sequence CDMA, EVALUATION DOCUMENT (DRAFT 1.0), Part 1: System Description & Performance Evaluation", UMTS Terrestrial Radio Access (UTRA), draft document, October 1997;

(14) Quick, Jr., "Random Access Communications Channel for Data Services", U.S. Pat. No. 5,673,259, September 1997;

(15) Argyroudis et. al., "Wireless Remote Telemetry System", U.S. Pat. No. 5,748,04, May 1998;

(16) TIA TR45.5, "The CDMA2000 ITU-R RTT Candidate Submission", June 1998.

(17) ETSI standard GSM 03.64, version 5.2.0, "Digital Cellular telecommunications System (Phase 2+): General Packet Radio Services (GPRS); Overall description of the GPRS radio interface, stage 2", January 1998;

(18) ETSI draft standard GSM 04.60, version 2.00, "Digital Cellular Telecommunications System (Phase 2+): General Packet Radio Services (GPRS); Mobile Station (MS)-Base Station System (BSS) Interface; Radio Link Control/Medium access Control Protocol", March 1998;

(19) A Polydoros, and J. Silvester, "Slotted Random Access Spread-Spectrum Networks: An Analytical Framework", IEEE Journal on Selected Areas in Communication, Vol. SAC-5, No. 6 Jul. 1987, pp. 989–1002;

(20) D. Makrakis, and K. M. S. Murthy, "Spread Slotted ALOHA Techniques for Mobile and Personal Satellite Communication Systems", IEEE Journal on Selected Areas in Communications, Vol. 10, No. 6, Aug. 1992, pp. 985–1002; and

(21) K Toshimitsu, T. Yamazato, M. Katayama, and A. Ogawa, "A Novel Spread Slotted ALOHA System with Channel Load Sensing Protocol", IEEE Journal on Selected Areas in Communications, Vol. 12, No. 4, May 1994, pp. 665–672.

Channel conflicts in single-channel wireless communication systems are generally resolved through the implementation of protocols such as Slotted ALOHA, Carrier Sense Multiple Access (CSMA), Attempt and Defer, and Reservation, which are disclosed, e.g., in references [1] and [2]. In the Slotted ALOHA protocol, for example, all mobile stations wanting to send a data block are assumed to be synchronized in time-slots over the shared uplink channel. Any mobile station may choose, in a random manner, a time-slot to send its data block. If two or more mobile stations attempt to access the same time-slot, a collision occurs and all mobile stations in this attempt will back off and wait for a random number of time-slots before they make another attempt. The throughput is limited, i.e., less than 0.368.

In the CSMA scheme, the mobile station desiring to send a data block will attempt to sense an open channel prior to sending its data block. If a busy signal is detected, each mobile station with an attempt will wait until the channel is open. This is sometimes called "Listen Before Send." The CSMA systems handles the occurrence of an access collision in the same way as the Slotted ALOHA protocol. However, the CSMA has improved performance relative to the Slotted ALOHA protocol, achieving a throughput of between 0.5 and 0.7.

In the Attempt and Defer protocol, as shown in FIG. 3, the data packet access process includes two phases, i.e., a contention resolution phase 30 and a data transmission phase 32. In the contention resolution phase, all mobile stations $34_1$–$34_4$ with attempts $36_1$–$36_4$ become involved in a resolution process in which the occurrence of a collision is resolved by determining a successful mobile station that is permitted to transmit a data packet 38 in the data transmission phase 32. Variances in the Attempt and Defer protocol, including Multi-Level Multi-Access or Binary Countdown as disclosed in reference [2] and the European wireless local network standard HiPERLAN as disclosed in references [3] and [4], also use bit sequences to compete for the access right, which results in at most one mobile station that successfully sends a data packet during the data transmission phase.

In the Reservation protocol illustrated in FIG. 4, there are three phases, i.e., request phase 40, reservation phase 41, and data transmission phase 42. In the request phase 40, one or more mobile stations can send request messages on an uplink channel 43 via one of the control time-slots 44. However, because the request messages are sent on a contention basis, they may collide with one another (note that the Slotted ALOHA protocol may be incorporated, for instance, to resolve this collision problem). Upon receiving the request messages from the mobile stations, the base station makes an assignment 45 in the reservation phase 41 and communicated via a downlink channel 46 to determine which of the corresponding mobile stations is permitted to send a data packet 47 during the transmission phase 42. A MAC access frame 48 includes the request phase 40 and the data transmission phase 42. Typical protocols of this category are Dynamic TDMA used in the wireless asynchronous transmission mode (ATM) system as disclosed in references [5] and [6].

Channel conflicts in a multi-channel wireless communication system, on the other hand, can be resolved through conventional protocols such as the Distributed Method and the Centralized Method. The Distributed Method, which is usually based on the ALOHA protocol, is often called a multi-channel ALOHA protocol. The multi-channel ALOHA protocol can be further categorized into two types, i.e., receiver-oriented and transmitter-oriented. Generally, in a multi-channel system with N channels, each mobile station is assumed to have N different receivers (transmitters) and one unique transmitter (receiver) for transmitter-oriented operation. In the transmitter-oriented method, each mobile station has the capability of receiving k data packets concurrently on all of the N channels. If there are M mobile stations in the system, let $MS_i$ represent the $i^{th}$ mobile station and $t_i$ represent the transmitter that is able to send packets on one unique channel $c_j$ from the N channels, where i=1 . . . M,j=1 . . . N . . . Letf$(t_i)$=$c_j$ mean that $MS_i$ is equipped with the transmitter $t_i$ on the channel $c_j$. If f$(t_i)$=$c_j$ and $MS_i$ has a transmission attempt, $MS_i$ sends a data packet on channel $c_j$ and then waits for the acknowledgment from the receiver. If no acknowledgment or negative acknowledgment is received, $MS_i$ waits for a random time and tries again. A negative acknowledgment occurs when the following condition takes place: (1) more than one transmitters send data packets on the same channel $c_j$, (2) more than k packets are sent to one receiver, and (3) a noisy communication link exists. The condition for a receiver-oriented protocol is very similar to the transmitter-oriented protocol discussed above.

The performance of the above-described distributed multi-channel system has been studied, e.g., in references [7] and [8]. It was shown that the normalized throughput is only between 0.25 and 0.5 when k is between 1 and 3. The performance of the multi-channel ALOHA system on a CDMA network was further studied in reference [8]. A drawback of the multi-channel ALOHA technique is that all attempts will be transmitted regardless of their success or failure. That is, all mobile stations wishing to send data packets will be permitted to send, and the colliding data packets will create a certain level of noise with regard to the successful data packets. This creates serious problems on CDMA systems since unnecessary signals become an interference source creating a high noise level in the communication link. For example, the maximal throughput of the Multi-channel ALOHA protocol in a CDMA network is around 0.3, which means that the failed packets may produce a noise level up to 0.7. This noise seriously degrades the performance of the CDMA network, and may interfere with the successful packets and result in additional errors. Several U.S. patents as disclosed in references [9], [10], and [11] relate to this category.

Other schemes use, e.g., a dedicated control channel to coordinate the transmission of data packets. For instance, a scheme called ALOHA/ALOHA is described in reference [12] and shown in FIG. 5. All mobile stations $50_i$–$50_w$ wishing to send data packets via data channels $52_i$–$52_w$ first send their attempts on a control channel 54. Each attempt includes three information elements, i.e., a source mobile station 55, a target mobile station 56, and a selected data channel w 57. The source mobile station will send a data packet 58 on the selected channel w shortly after the attempt message was sent. In the meantime, all mobile stations $50_i$–$50_w$ listen to the control channel 54. If there is a message indicating that the source mobile station (e.g., $MS_1$) is about to send a data packet to a target mobile station (e.g., $MS_2$), the target mobile station will be directed to receive the data packet on the appropriate channel. This scheme is similar to the random access protocol proposed for the wideband DS-CDMA as disclosed in reference [13].

Another category of techniques is denominated the Centralized Method which is contrasted with the distributed method described above. The Centralized Method protocol is shown in FIG. 6. In FIG. 6, a base station 60 is used to coordinate the whole traffic regarding packet transmission and receiving. In particular, two dedicated control channels, i.e., an access channel 61 and a page channel 62, as disclosed in references [14] and [15], are used. Channels other than the above two control channels are referred to as traffic or data channels $63_1$–$63_w$. In this method, all communications among mobile stations $64_1$–$64_3$ are completed via the base station 60. There are two types of channel directions, i.e., uplink (reverse) and downlink (forward). The uplink channel carries data messages from the mobile stations $64_1$–$64_3$ to the base station 60, and the downlink channel carries a grant message 65 from the based station 60 to the mobile stations $64_1$–$64_3$. Any mobile station wishing to send a data packet 66 can send a request message 67 to the base station via the access channel 61. The access channel 61 is subjected to contention since two or more mobile stations may raise their requests simultaneously. If a request message is successfully received by the base station, the base station will send a grant message 65 to the source mobile station via the page channel 62. The grant message 65 indicates that the source mobile station was granted permission to send a data packet on one of the data channels. For example, the grant message 65 may contain information such as the data channel number and time-to-send request.

One drawback of the Centralized Method involves access delay (i.e., the passage of time between submitting a request and receiving a grant), which can be relatively long especially when the number of mobile stations is large. Additionally, the traffic load on the access channel can be relatively high in the Centralized Method, which in turn can further increase the access delay.

The conventional MAC protocol is discussed in, e.g., reference [1]. Conventional MAC protocols such as the multi-channel slotted ALOHA protocol ate typically used in communication systems being considered by the International Telecommunication Union technology, such as the Wideband Direct Sequence (DS)-CDMA technology as disclosed in reference [13] or the CDMA-2000 technology as disclosed in reference [16] to facilitate its random access scheme and resolve contention problems. The Wideband DS-CDMA system is particularly applicable to a third generation mobile system which will provide a higher bit rate, more service categories, and more efficient radio access to the mobile stations, for example, packet-based radio access and variable bit rate transmission. Consideration of inter-operation with other existing mobile systems such as GSM, IS-95 and IS-136 are important issues. Communication systems for use in the third generation mobile systems are the GSM phase 2 plus General Packet Radio Service (GPRS) disclosed in references [17] and [18] and the multi-code spread slotted ALOHA disclosed in references [9], [19], [20], and [21]. The typical approach usually assumes there are m different CDMA receivers/transmitters, each able to transmit/receive data that are spread by a certain code. A slotted ALOHA scheme is then applied such that each user first randomly selects a spreading code for transmitting/receiving, then the slotted ALOHA in the time domain is performed afterwards. A disadvantage of this approach is the high complexity of each mobile station. The random access scheme presented in the Wideband DS-CDMA system uses a preamble code and a time-offset before the transmission of each data packet. It minimizes the complexity of mobile stations by requiring that all communications between two mobile stations be via a base station, thus putting most of the complexity on the base station. However, since the basic access scheme is multi-code spread slotted ALOHA, a failed random access attempt will still produce unnecessary interference and a great amount of code resources are reserved for channel access, resulting in low channel efficiency.

The original random access scheme in the Wideband DS-CDMA described in reference [1]is shown in FIG. 8. Each packet $82_1$–$82_4$ (called a Random-Access Burst) from the mobile stations $84_1$–$84_4$ is transmitted within a frame period 86 of 10 milliseconds (ms). Each of the packets $82_1$–$82_4$ has two parts, i.e., a preamble part 82A of length 16*256 chips (1ms) and a data part 82B of variable length. The preamble code in the preamble part 82A consists of 16 symbols spread by an Orthogonal Gold code of length 256 chips. Up to 16 simultaneous transmissions of the packets $82_1$–$82_4$ can be successfully received in each cell. One of the 16 preamble codes is randomly chosen at each random access attempt.

As shown in FIG. 8, each 10 millisecond frame 86 is further divided into five time-offsets of 2 millisecond periods 88. Each of the data packets $82_1$–$82_4$ can only be transmitted in a j*2 mobile station time-offset (j=0,1,2,3, or 4) relative to the 10 mobile station frame boundary. The data part 82B of the packet will be spread and modulated using another scrambling code that will be chosen based on the randomly chosen preamble code and the randomly chosen time-offset. That is, one of 80 orthogonal scrambling codes will be selected for each random access attempt. Since each preamble code is one millisecond long, it guarantees that two simultaneous random access attempts that use different preamble codes and/or different time-offsets will not collide during the data part of the packet. With this scheme, a base station may receive up to 80 random access attempts within one 10 millisecond frame.

In this scheme, let $p_i$ denote the $i^{th}$ preamble code i=0 . . . 15, $t_j$ denote the $j^{th}$ time-offset (j=0 . . . 4) and $s_k$ denote the $k^{th}$ scrambling code for data part (k=0 . . . 79). Also, let P represent the set of all preamble codes, T represent the set of all time-offsets, and Ψ represent the set of all scrambling codes. Their relation is summarized as follows:

Definition 1: A function of f: PxT→Y is a 1-to-1 mapping function where $$\forall p_i \in P, \forall t_j \in T, \forall s_k \in \Psi, \text{ and } f(p_i, t_j) = s_i + 16j \quad (1)$$

Although mobile stations may select different time-offsets as their stating point of random access attempts, all data parts can be as long as 10 ms. As a result, random access attempts on different time-offsets will use different scrambling codes. For example, as shown in FIG. 9, the data packets $92_1$–$92_4$ each consisting of, e.g., a preamble part 92A and a data part 92B are transmitted from the mobile stations $94_1$–$94_4$ during the frame period $96_1$ of 10 mobile station (i.e., five subframes 98 of 2 milliseconds each) or the subsequent frame period $96_2$ of 10 milliseconds. The data part 92B having a length 99 of 10 milliseconds may be extended to the beginning of the same time-offset of the next frame $96_2$.

Additionally, assuming that there are n mobile stations, each having a data packet arrival probability of λ (in every 10 millisecond frame), the probability that a mobile station successfully transmits a data packet in a frame is $$\lambda \sum_{z=1}^{n} (1-\lambda)^{n-z} \cdot \lambda^{z-1} \cdot \left(1 - \frac{1}{|P| \cdot |T|}\right)^{z-1} \cdot \binom{n-1}{n-z} = \\ \lambda(1-\lambda+\lambda)\left(1 - \frac{1}{|P| \cdot |T|}\right)^{n-1} = \lambda\left(1 - \frac{\lambda}{|P| \cdot |T|}\right)^{n-1} \quad (2)$$

Since a random access attempt may occasionally fail, it will be backlogged temporarily and will need a retransmission in one of the following frames. This results in an effect that the traffic load offered by each mobile station is actually larger than the packet arrival rate λ. Let κ denote the offered load consisting of packet arrival rate λ and backlogged retransmission attempt. The successful probability in Equation (2) should be modified to be $$= k\left(1 - \frac{k}{|P| \cdot |T|}\right)^{n-1} \quad (3)$$

The average system throughput is defined as the number of successful packet transmissions in each frame (packets/frame). Since there are n mobile stations, the system throughput is therefore equal to $$= nk\left(1 - \frac{k}{|P| \cdot |T|}\right)^{n-1} \quad (4)$$

A plot for Expression (4) is shown in FIG. 10 in which |P|=16 and |T|=5 (see reference [13]). The maximum throughput is 29.44 packets/frame out of 80 simultaneous random access attempts. The result (29.44/80=0.368) matches the result for slotted ALOHA in the TDMA system. The difference is that it is now in the form of hybrid TDMA/CDMA. The case for a multi-code spread slotted ALOHA in CDMA system is even worse than slotted ALOHA in TDMA, which has a low throughput and unstable performance. Failed random access attempts will create unnecessary interference over the successful transmissions since all attempts are transmitted in parallel. In CDMA systems, the reduction of interference is as important as the increase of throughput when a MAC protocol is designed. For instance, assuming that there are 30 mobile stations having uplink access attempts, only 11 (0.368*30) of them will be successful and the other 19 attempts will become noise to the successful signals. This is a serious problem in wireless communications.

An additional problem of the WCDMA random access scheme is in its code allocation. There is no flexibility in code assignment. Any mobile station can randomly choose a scrambling code $s_k$ (determined by the preamble code and time-offset). The multi-channel wireless system using the WCDMA random access scheme has to reserve a total number of 80 scrambling codes for random access, while achieving only a maximum throughput of 0.368. This creates a seriously inefficient allocation of radio resources.

SUMMARY OF THE INVENTION

In view of the foregoing disadvantages with the prior art systems, it is the object of the present invention to provide an improved MAC protocol for use in a multi-channel wireless communication system to reduce communication interference and minimize access delay.

It is another object of the present invention to provide a new MAC protocol which improves the random access method in Wideband DS-CDMA by adding the processes of contention resolution and code assignment into the random access scheme such that allocation of code resources is highly flexibly controlled and unnecessary random access attempts are avoided to obviate interference from failed access attempts.

The present invention achieves the above objects in a multi-channel communication system for wireless data communication comprising a first station, a plurality of second stations, and a medium access control protocol for controlling the operation of the data communications between the first station and the second stations, wherein the communication operation comprises (1) transmitting request packets from the second stations to the first station, each of the request packets including a preamble code and a padding code encoded by a random access scrambling code, (2) transmitting a series of code assignment commands encoded by a channelization code from the first station to the second stations based on the request packets processed by the first station, and transmitting the data packets encoded by data scrambling codes from the second stations to the first station based on the assignment commands. In one embodiment, the system is a WCDMA system wherein the first station is a base station and the second stations are mobile stations.

Other features and advantages of the invention will become apparent upon reference to the following description of the preferred embodiments when read in light of the attached drawings.

DESCRIPTION OF THE PREFERRED EMBODIMENTS

Figure 1:
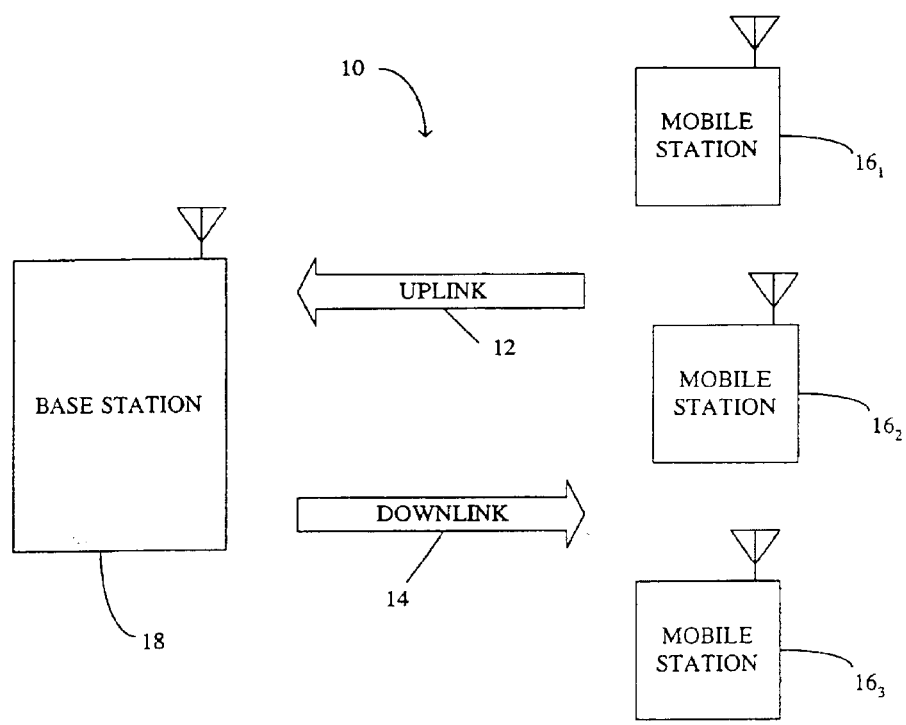
FIG. 1 is a block diagram showing a base station and a plurality of mobile stations in a conventional single-channel wireless communication system.
Figure 2:
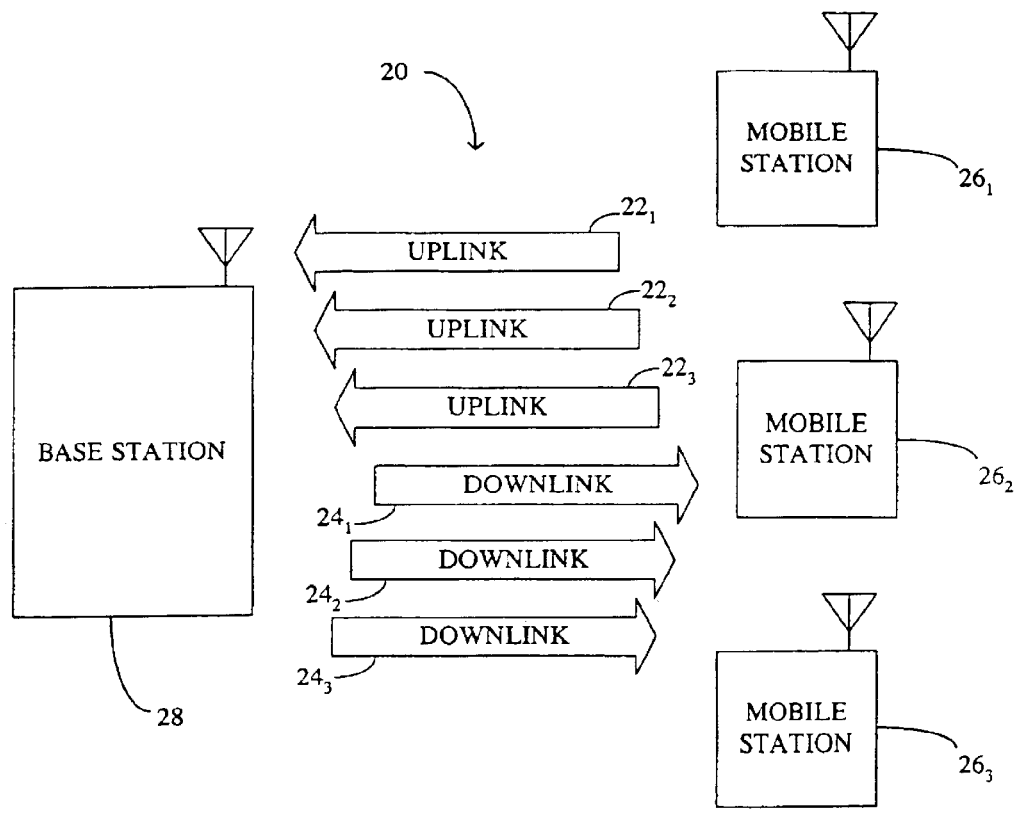
FIG. 2 is a block diagram showing a base station and a plurality of mobile stations in a conventional multi-channel wireless communication system.
Figure 3:
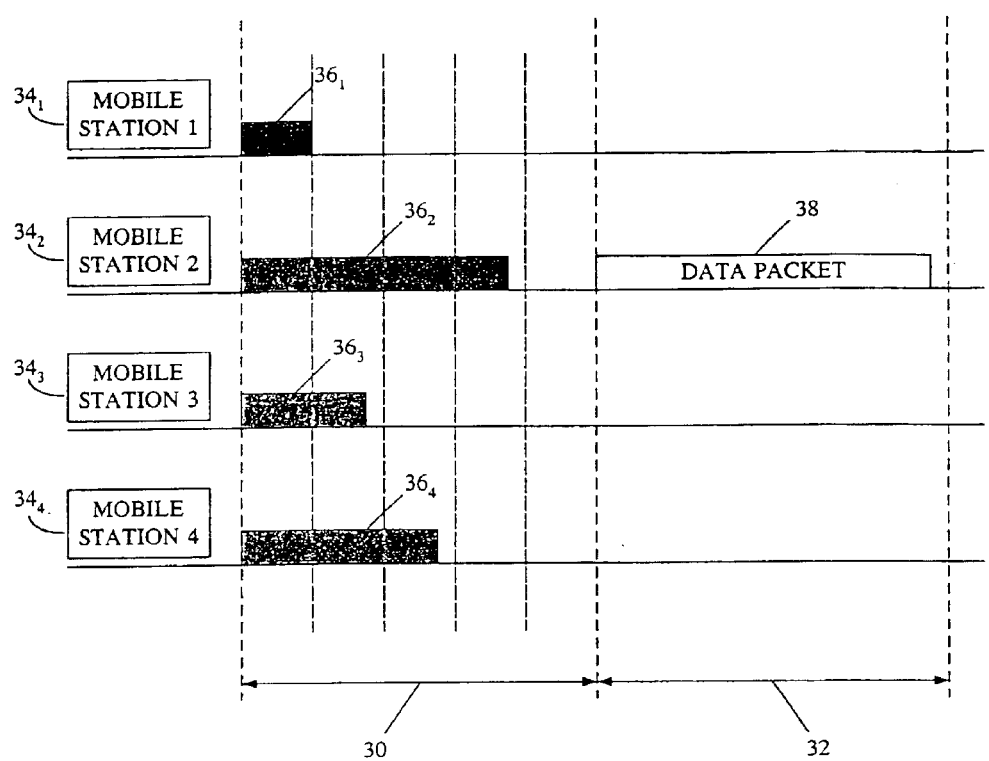
FIG. 3 is an illustration for explaining a two-phase MAC protocol of the conventional single-channel wireless communication system.
Figure 4:
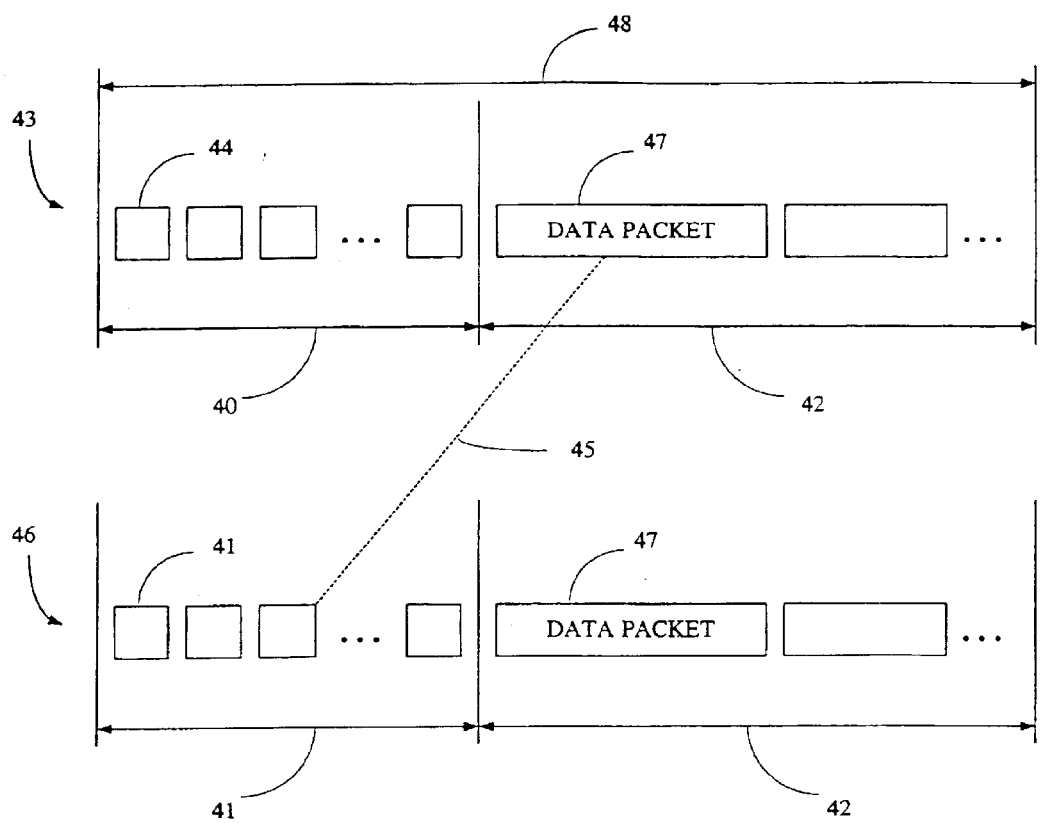
FIG. 4 is an illustration for explaining a three-phase MAC protocol of the conventional single-channel wireless communication system.
Figure 5:
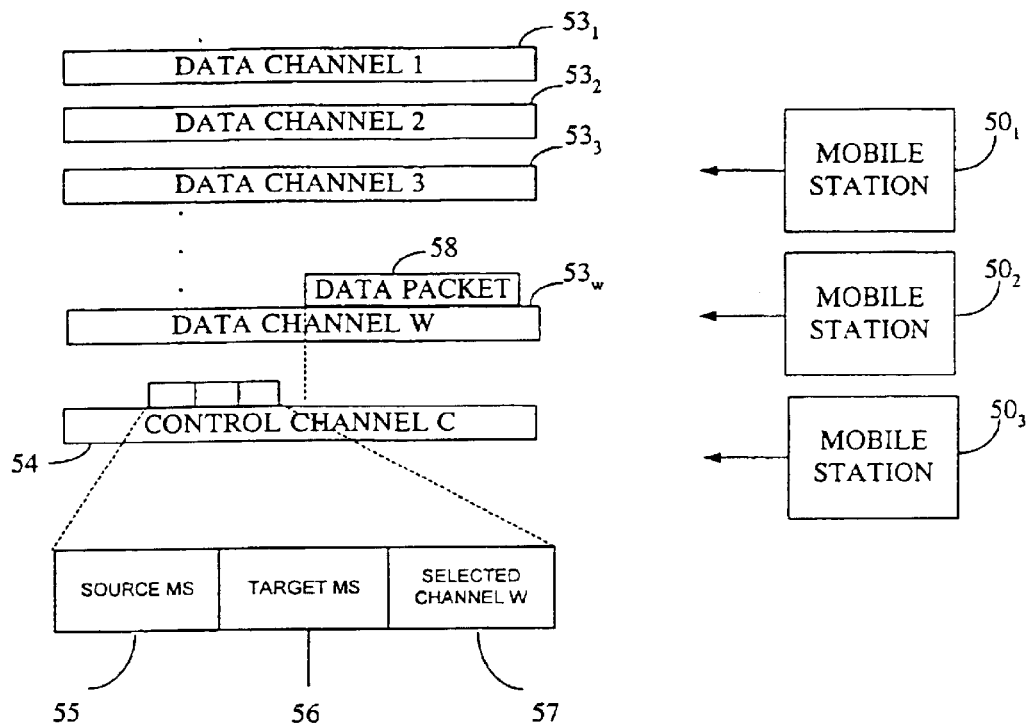
FIG. 5 is a block diagram showing a distributed MAC protocol for the conventional multi-channel wireless communication system.
Figure 6:
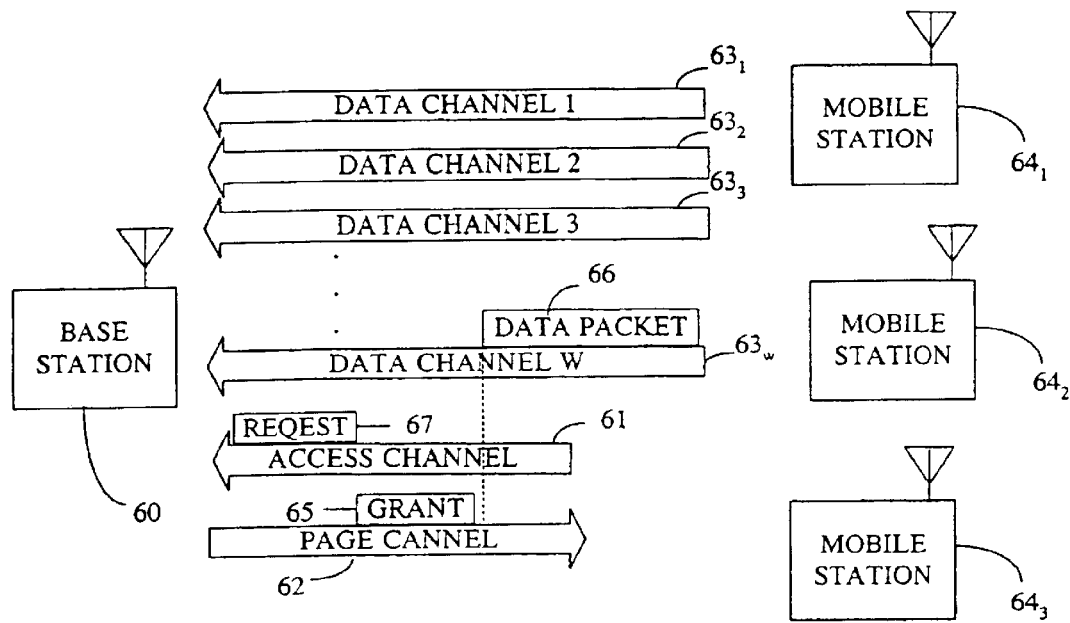
FIG. 6 is a block diagram showing a centralized MAC protocol for the conventional multi-channel wireless communication system.
Figure 7:
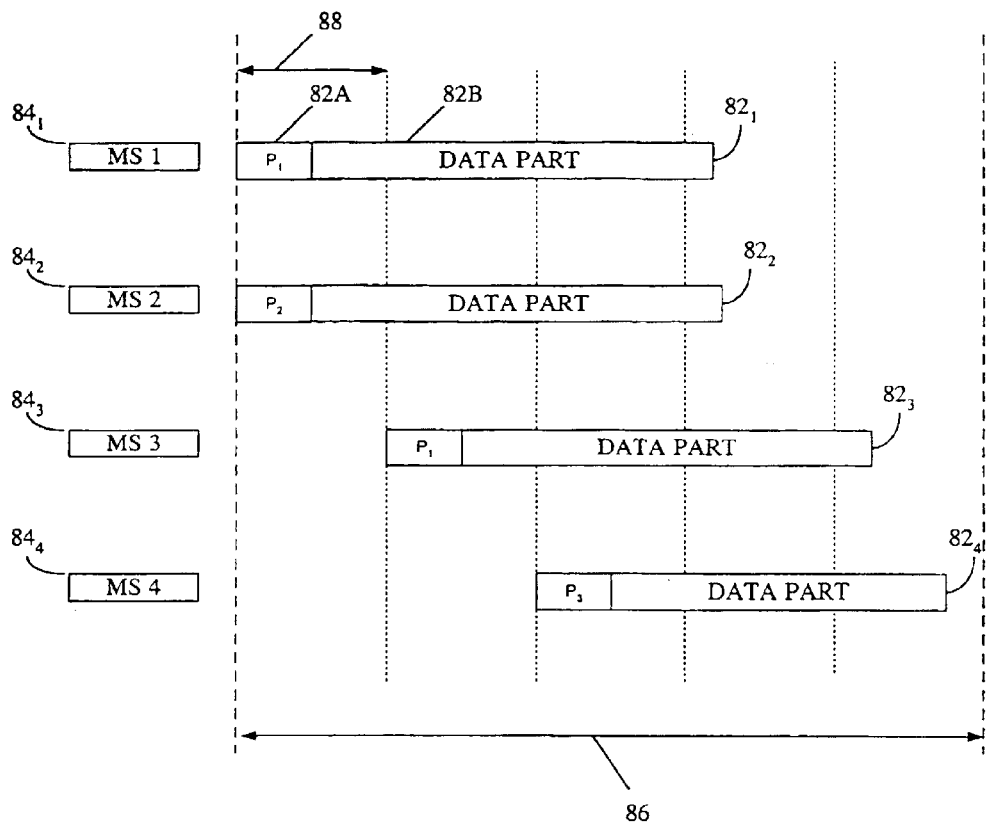
FIG. 7 is an illustration for explaining data transmission in one frame period of the conventional wireless multi-channel communication system.
Figure 8:
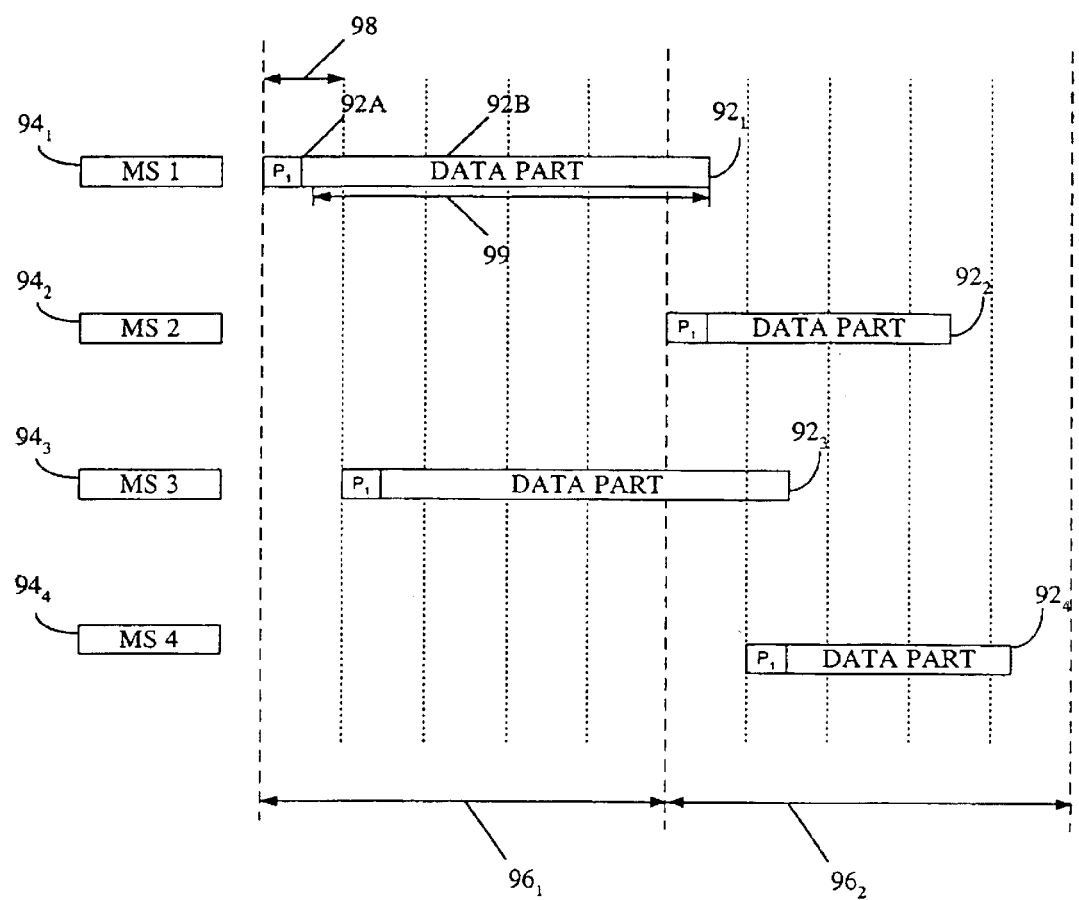
FIG. 8 is an illustration for explaining data transmission in two frame periods of the conventional wireless multi-channel communication system.
Figure 9:
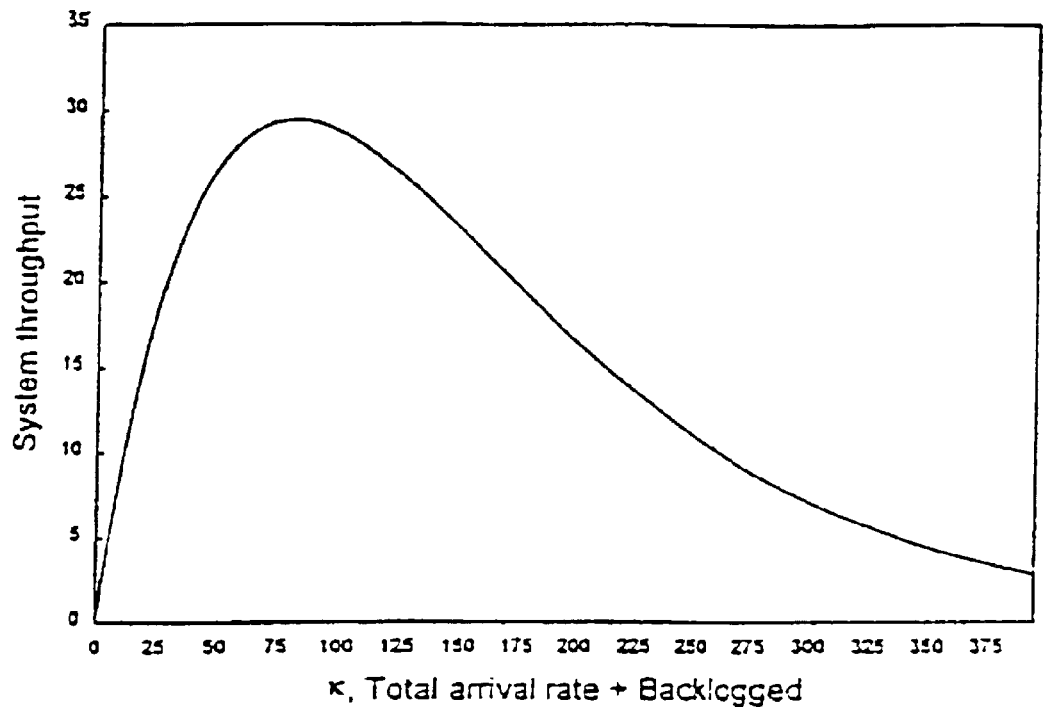
FIG. 9 is a graphic representation of the throughput of the conventional wireless multi-channel communication system.
Figure 10:
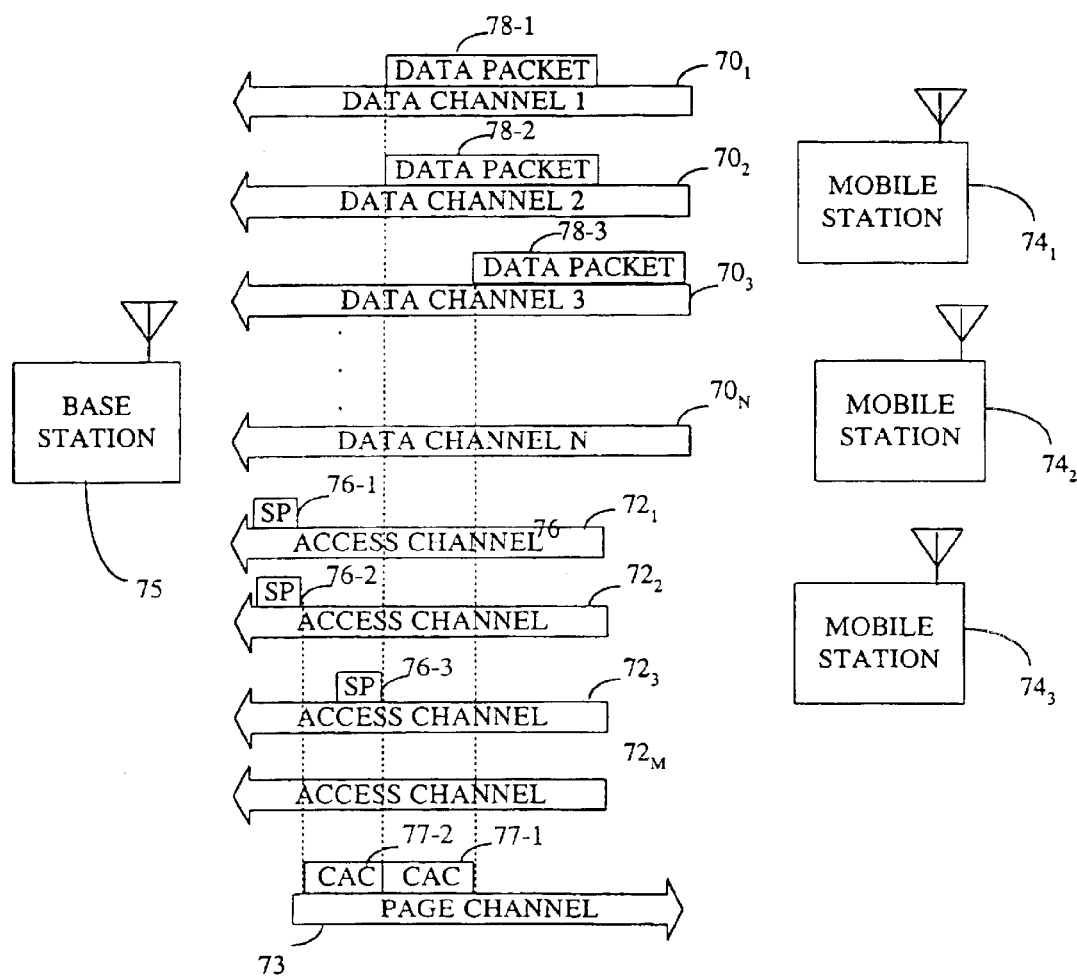
FIG. 10 is a block diagram showing an improved MAC protocol for a multi-channel wireless communication system according to the present invention.

FIG. 10 illustrates the improved multi-channel MAC protocol of the present invention as applied to a WCDMA system. It should be noted that the invention is equally applicable to other multi-channel communication systems, such as WDMA, FDMA, and others. As shown in FIG. 10, communication channels are divided into two sets, N data channels $70_1$–$70_N$ and M+1 control channels comprising access channels $72_1$–$70_M$ and page channel 73 which is a downlink control channel. All of the N data channels $70_1$–$70_N$ are uplink only channels while the M+1 controls channels are M uplink channels $72_1$–$70_M$ plus an additional downlink channel 73. If all three of the mobile stations $74_1$–$74_3$ shown in FIG. 4 wish to send a short packet (SP) 76 to a base station 75, they would follow procedures in the three phases as follows:

(1) Contention phase: the mobile stations send the short packets $76_1$–$76_3$ to the base station 75 via the M control channels $71_1$–$72_M$. Each of the short packets contains dummy data or padding bits which are error-protected by an error detection code (e.g., Cyclic Redundant Code);

(2) Channel-assignment phase: the mobile stations wait for channel assignment commands (CAC) $70_1$–$70_3$ sent by the base station 75 on the downlink control or page channel 73; and (3) Data transmission phase: the mobile stations send data packets $78_1$–$78_3$ on data channels $70_1$–$70_3$ if the channel assignment commands indicate that the short packets $76_1$–$76_3$ sent by the mobile stations $74_1$–$74_3$ are valid.

Figure 11:
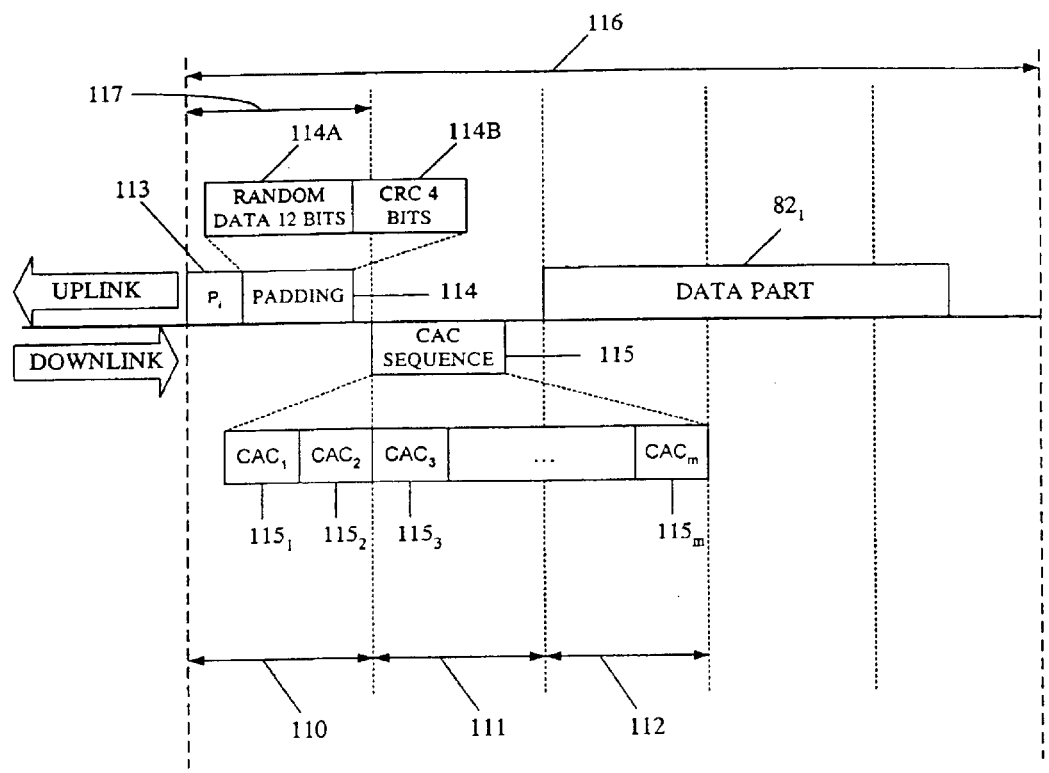
FIG. 11 is an illustration for explaining the improved MAC protocol in the multi-channel wireless communication system according to the present invention.

FIG. 11 shows further details of the wireless multichannel communication system of the present invention. In FIG. 11, an improved MAC protocol for use in, e.g., WCDMA, includes a contention phase 110, a code-assignment phase 111, and a data-transmission phase 112. A mobile station (not shown in FIG. 11) with a random access attempt should first choose a time-offset and transmit its preamble code 113, which is followed by a 16 bit padding 114 which consists of 12-bit random data 114A and a 4-bit CRC 114B. Each mobile station will generate the 12-bit random data and use the 4-bit CRC 114B for error checking. The padding bits 114 should be encoded by one of the scrambling codes. The selection of the scrambling code is determined by the selected preamble code 113. The 1-to-1 mapping function g:P→Ψ is defined below for this purpose $$g(p_i)=s_i, i=0 \ldots 15 \quad (5)$$

In particular, if a mobile station selects a preamble code $p_2$ for a random access attempt, it will use a scrambling code $s_2$ for its padding bits 114. A mobile station with a random access attempt will first choose a time-offset, then choose a preamble code and a scrambing code (for padding bits), and complete the contention phase by transmitting the "preamble code+padding bits" combination.

The code-assignment phase 111 is handled by a base station (not shown in FIG. 11). At the base station, different preamble codes can be distinguished and recognized since they are all orthogonal codes and can be differentiated by a CDMA match filter (not shown). If two or more mobile stations use the same preamble code, then the base station checks the padding bits to see if it is correctly received (i.e., by checking the CRC bits 116) so as to determine whether this preamble code is sent by one mobile station or a plurality of mobile stations. In other words, the base station can determine which mobile station gains the right of access by adhering to Rule A as discussed below:

Rule A-if a preamble code $p_i$ is correctly received and a sequence of padding bits encoded by scrambling code $s_i$ is also received without error, it can be guaranteed that a random access attempt which had chosen preamble code $p_i$ is successful.

After the base station has determined all the successful random access attempts, it will use a dedicated downlink control channel (DDCCH) to notify the mobile station of its success or failure. A CAC sequence 115 will be used for this purpose. There are m Code Assignment Commands, i.e., $CAC_1$ to $CAC_m$ ($115_1$ to $115_m$ in FIG. 11) that will be broadcast sequentially via the DDCCH in all mobile stations. Each CAC carries the preamble code number q to indicate that the random access attempt using preamble code $p_q$ is successful. Since there are 16 preamble codes, each CAC requires 4 bits to represent the preamble code number. To ensure a correct code assignment, a 4-bit CRC or checksum may be added immediately after the last CAC. If a mobile station does not receive the sequence of CAC correctly, it assumes that it has failed in this frame and will try again in one of the coming frames. Since a failed random access attempt will not transmit its data part, there is no unnecessary interference to the normal data transmission.

Figure 12:
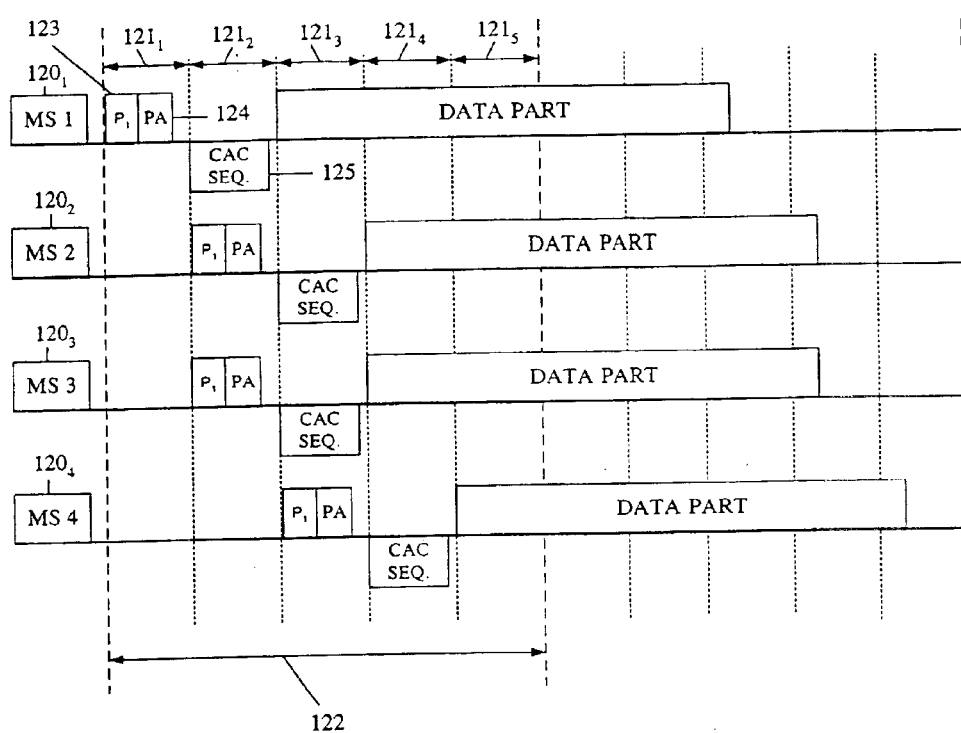
FIG. 12 is an illustration for explaining the improved MAC protocol in the multi-channel wireless communication system according to the present invention.

As shown in FIG. 12, the contention phase for mobile stations $120_1$–$120_4$ may begin at any of the time-offsets $121_1$–$121_5$. There are 5 time-offsets $121_1$–$121_5$ in the frame 122. Therefore, five series of "Contention+Code-Assignment+Data transmission" may run in pipeline in the frame 116. Each "preamble code 123+padding bits 124" is no longer than the duration of each time-offset, i.e., $121_1 \ldots 121_5$. A 36-bit CAC sequence 125 (8 CACs+1 CRC) is also less than the duration of each time-offset, i.e., $121_1 \ldots 121_5$. It is noted that the speed of transmission as disclosed in reference [13] is 4.096 Mchips/sec in which 256 chips consist of one symbol, and one symbol may represent 2 bits.

After the contention phase and the code-assignment phase, the mobile stations then assess whether or not their random access attempts were accepted. In the following data-transmission phase, each of the mobile stations uses a scrambling code $s_k$ to transmit its data part. The selection of the scrambling code $s_k$ is determined according to Rule B discussed below:

Rule B: Assuming that a mobile station has a random access attempt, in the contention phase, the preamble code $p_i$ is transmitted in the $j^{th}$ time-offset. Then, in the code-assignment phase, if this mobile station detects in the CAC sequence that there is one CAC (assumed to be the $r^{th}$ command $CAC_r$) containing the same preamble code number i, then this random access attempt is successful and this mobile station can use scrambling code $s_k$ to transmit its data part in the data-transmission phase. And k is selected via $$k=j \times m+r \quad (6)$$

where j represents a sequence number that indicates a particular time-offset in a number of time-offsets in a 10 millisecond frame, m represents a number of the CACs in the CAC sequence, and r represents a sequence number that indicates in the CAC sequence the position of the CAC which represents the preamble code $P_i$.

Usually m is required to be sixteen because it is possible to have at most sixteen successful random access attempts that are using different preamble codes. But this would require a reservation of 16*5=80 scrambling codes that are dedicated for the data transmission. It is suitable and reasonable for the present invention to assume that the probability of having sixteen successful random access attempts is very low. If m is limited to a number smaller than 16, a lot of code resources can be released accordingly. For example, letting m=8 means that there are at most 8 CACs that respond to each contention phase. In this case, 8*5=40 scrambling codes are needed for data transmission. In addition to the channelization code required by DDCCH and the 16 scrambling codes required in the code-assignment phase ($s_0, \ldots, s_{15}$), a total of 57 scrambling codes are required for the common access channel. Let Nc denote the total number of scrambling codes required by the MAC protocol of the present invention. Then $$N_c = 17 + 5 \times m \quad (7)$$

As discussed above, the improved MAC protocol of the present invention provides interference reduction and code resource saving. From the above analysis, it is apparent that only 29 out 80 attempts are successful; thus, it is highly wasteful to allocate 80 dedicated scrambling codes. By allowing m to be 8 such that $N_c=57$, the present invention takes advantage of the fact that the probability of having more than eight successful random access attempts is very low, thereby achieving high performance (equal to that of the original WCDMA protocol) while using less code resources.

Additionally, although it is rare that there are more than eight successful random access attempts in the contention phase, this can occur. Therefore, the improved MAC protocol of the present invention assigns codes (CACs) to at most eight attempts. The remaining successful attempts will be processed as failed ones. Since this does not happen very often, the performance will not drop significantly. Following is Rule C that summarizes the above process:

Rule C: In each contention phase, if there are more than m successful random access attempts, only m of them will be assigned with a code via the CAC sequence. The remaining successful attempts will be processed as failed ones.

A simulation on the proposed MAC protocol will now be described. The packet arrival rate of each mobile station in each frame is assumed to be the Poisson distribution. Let n denote the total number of mobile stations. Each mobile station has a very large packet buffer for queuing new-arrival and backlogged packets. Throughput and delay are measured. Throughput is defined as the average number of successful packet transmissions in a 10 millisecond frame. Access delay is defined as the average waiting time between a packet's first random access request and its success in being transmitted. Queuing delay is defined as the average queuing time between the arrival of a packet and its success in being transmitted.

Figure 13:
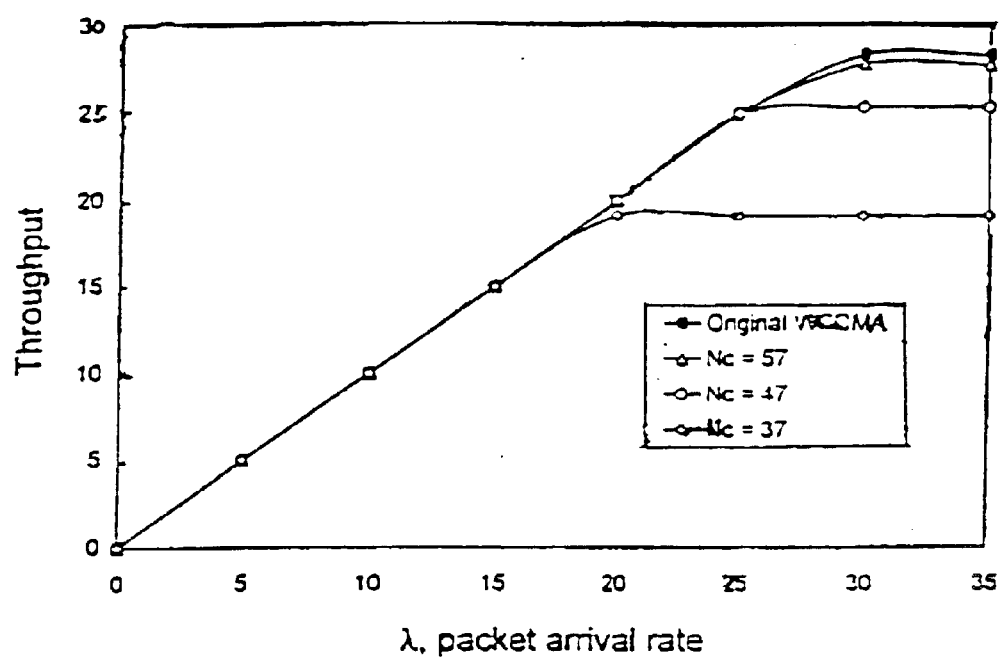
FIG. 13 is a graphic representation of a throughput comparison between conventional medium access control protocol and the improved medium access protocol of the present invention.
Figure 14:
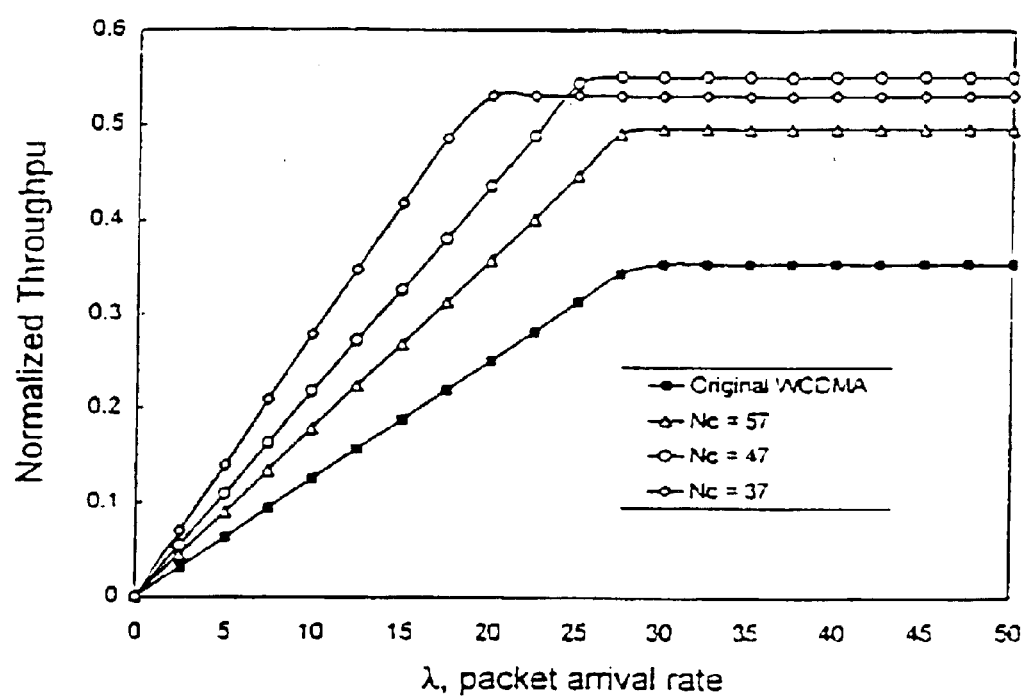
FIG. 14 is a graphic representation of a normalized throughput comparison between conventional medium access control protocol and the improved medium access protocol of the present invention.

A throughput measurement of n=100 is shown in FIG. 13. The performance of $N_c=57$ is very close to the original WCDMA MAC protocol. However, the required code resource is 57 instead of 80. This saves a great amount of radio resources. From another point of view, the system throughput is increased. Since the achieved throughput is approximately 28 out of 57, the normalized throughput can be calculated as $28/57=0.491$. In FIG. 13, the results for NC=47, 57 are also shown. The maximum throughput is around 25 and 19. Thus, the normalized throughput is approximately $25/47=0.532$, and $19/37=0.514$. A normalized throughput is shown in FIG. 14. The improvement relative to the original WCDMA scheme is significant.

Figure 15:
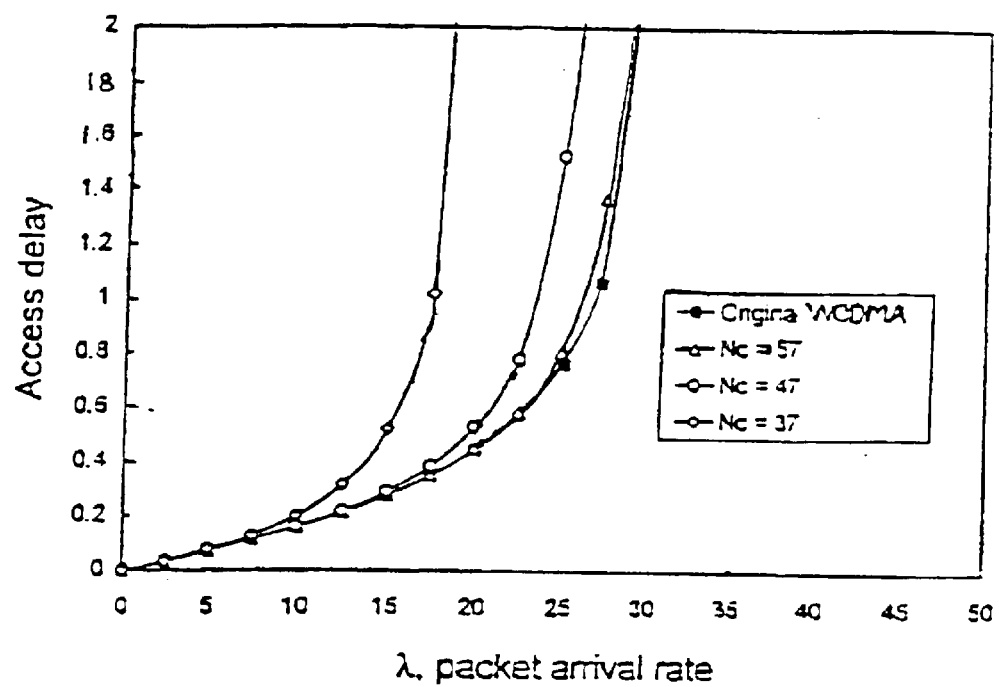
FIG. 15 is a graphic representation of an access delay comparison between conventional MAC protocol and the improved medium access protocol of the present invention.

FIG. 15 depicts the access delay performance showing that the access delay is very low if the traffic is not overloaded. This favorable result is due to the good characteristics of CDMA. Data packets can be transmitted in parallel as long as they are spread by different codes.

Figure 16:
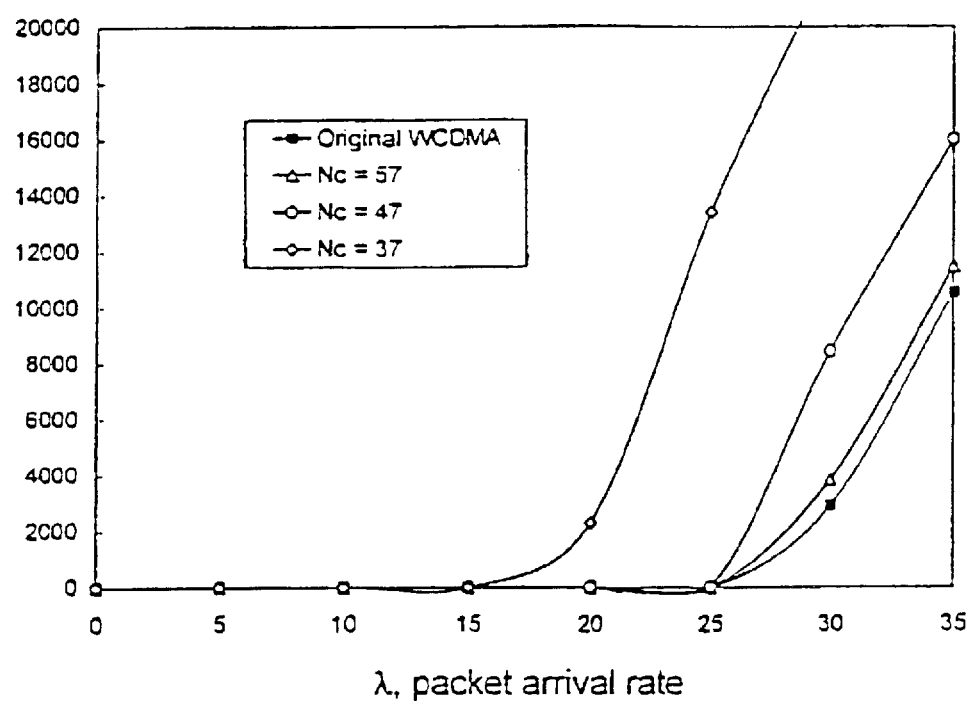
FIG. 16 is a graphic representation of a queuing delay comparison between conventional MAC protocol and the improved medium access protocol of the present invention.

The queuing delay is shown in FIG. 16, where the queuing delay is also low for light-loaded traffic. However, if the incoming traffic increases and the system saturates, the queuing delay will grow suddenly to infinity. This also reflects the unstable property of slotted ALOHA protocols and shows the strong needs for an improved MAC protocol to increase the system capacity.

It should be noted that, unlike the original WCDMA scheme, the improved MAC protocol of the present invention does not involve a failed random access attempt involving a data part. Due to the unnecessary interference in the original WCDMA MAC protocol, the actual performance of the original WCDMA MAC protocol is inferior to the simulation results shown in FIGS. 13–16.

While particular embodiments of the present invention have been shown and described, it will be apparent to those skilled in the art that various changes and modifications may be made therein without departing from the spirit or scope of the invention. Accordingly, it is intended that the appended claims cover such changes and modifications that come within the spirit and scope of the invention.

What is claimed is:

1. A communication method, comprising:
   transmitting, during one of a plurality of offset periods, a channel access request that is encoded by a first scrambling code;
   receiving a channel grant that identifies the first scrambling code; and
   selecting a second scrambling code for use in communicating information over the granted channel based on the particular one of the plurality of offset periods used to communicate the channel access request.

2. The communication method of claim 1, wherein:
   the second scrambling code is selected in accordance with the expression k=j*m+r, where
   k identifies a particular one of a plurality of prospective scrambling codes that may be selected for the second scrambling code,
   j identifies the particular one of the plurality of offset periods during which the channel access request was communicated,
   m is an integer greater than 1 that identifies a permissible number of concurrently granted channels, and
   r indexes the channel grant within a plurality of communicated channel grants.

3. The communication method of claim 2 wherein the value of m is selected to accord with an acceptable amount of communication interference among the concurrently granted channels.

4. The communication method of claim 1 further comprising:
   selecting a distinct second scrambling code for each of a plurality of channels granted by a plurality of communicated channel grants, wherein
   the granted channels derive a substantial degree of orthogonality from one another through the selected second scrambling codes.

5. A communication system, comprising:
   a first terminal that communicates, during one of a plurality of offset periods, a channel access request that is encoded by a first scrambling code; and a second terminal that receives the channel access request and communicates to the first terminal a channel grant that identifies the first scrambling code, wherein the second terminal selects a second scrambling code for use in communicating information over the granted channel based on the particular one of the plurality of offset periods used to communicate the channel access request.

6. The communication system of claim 5, wherein:

the second terminal selects the second scrambling code in accordance with the expression $k=j*m+r$, where:
- k identifies a particular one of a plurality of prospective scrambling codes that may be selected for the second scrambling code,
- j identifies the particular one of the plurality of offset periods during which the channel access request was communicated,
- m is an integer greater than 1 that identifies a permissible number of concurrently granted channels, and
- r indexes the channel grant within a plurality of communicated channel grants.

7. The communication system of claim 6 wherein the value of m is selected to accord with an acceptable amount of communication interference among the concurrently granted channels.

8. The communication system of claim 5 further comprising:

a third terminal that selects a different second scrambling code than that selected by the first terminal, for communicating information on a different channel granted by the second terminal, wherein the granted channels derive a substantial degree of orthogonality from one another through the selected second scrambling codes.

* * * * *